(12) United States Patent
Kim

(10) Patent No.: US 12,230,823 B2
(45) Date of Patent: Feb. 18, 2025

(54) BATTERY PACK AND VEHICLE INCLUDING THE SAME

(71) Applicant: LG CHEM, LTD., Seoul (KR)

(72) Inventor: Sun-Hong Kim, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 868 days.

(21) Appl. No.: 16/973,675

(22) PCT Filed: Sep. 27, 2019

(86) PCT No.: PCT/KR2019/012611
§ 371 (c)(1),
(2) Date: Dec. 9, 2020

(87) PCT Pub. No.: WO2021/060587
PCT Pub. Date: Apr. 1, 2021

(65) Prior Publication Data
US 2021/0376419 A1 Dec. 2, 2021

(51) Int. Cl.
*H01M 50/242* (2021.01)
*B60L 50/64* (2019.01)
*H01M 50/258* (2021.01)

(52) U.S. Cl.
CPC .......... *H01M 50/242* (2021.01); *B60L 50/64* (2019.02); *H01M 50/258* (2021.01); *H01M 2220/20* (2013.01)

(58) Field of Classification Search
CPC ................................................ H01M 2220/20
See application file for complete search history.

(56) References Cited

U.S. PATENT DOCUMENTS

| | | |
|---|---|---|
| 8,083,245 B2 | 12/2011 | Hatzikakidis |
| 2003/0215687 A1 | 11/2003 | Bruck et al. |
| 2010/0247980 A1 | 9/2010 | Jang et al. |
| 2011/0223776 A1 | 9/2011 | Ferber, Jr. |
| 2015/0093604 A1 | 4/2015 | Jang et al. |
| 2017/0054119 A1 | 2/2017 | Lee |
| 2017/0094823 A1 | 3/2017 | Montazeri |
| 2017/0256883 A1 | 9/2017 | Kim et al. |
| 2017/0309874 A1 | 10/2017 | Hsia et al. |
| 2018/0169851 A1 | 6/2018 | Radovich et al. |
| 2018/0323420 A1 | 11/2018 | Lee |
| 2020/0083515 A1 | 3/2020 | Lejosne et al. |

FOREIGN PATENT DOCUMENTS

| | | |
|---|---|---|
| CN | 103204126 A | 7/2013 |
| CN | 204696170 U | 10/2024 |
| JP | 9-274906 A | 10/1997 |
| JP | 10-16689 A | 1/1998 |

(Continued)

OTHER PUBLICATIONS

Extended European Search Report dated Jul. 14, 2021 for Application No. 19940166.2.

*Primary Examiner* — Haroon S. Sheikh
(74) *Attorney, Agent, or Firm* — Birch, Stewart, Kolasch & Birch, LLP

(57) ABSTRACT

A battery pack mounted to a vehicle includes a plurality of battery modules, each having at least one battery cell; and at least one magnetic member provided to one side surface of facing battery modules among the plurality of battery modules to at least partially detachably fix the plurality of battery modules to each other.

12 Claims, 5 Drawing Sheets

(56) References Cited

FOREIGN PATENT DOCUMENTS

| | | | |
|---|---|---|---|
| JP | 2856987 | B2 | 2/1999 |
| JP | 2011-505650 | A | 2/2011 |
| JP | 2013-525942 | A | 6/2013 |
| JP | 2017-530503 | A | 10/2017 |
| JP | 2020-43076 | A | 3/2020 |
| KR | 10-0298780 | B1 | 9/2001 |
| KR | 10-2003-0048096 | A | 6/2003 |
| KR | 10-1283953 | B1 | 7/2013 |
| KR | 10-2014-0006268 | A | 1/2014 |
| KR | 10-1495227 | B1 | 2/2015 |
| KR | 10-2016-0141209 | A | 12/2016 |
| KR | 10-2017-0039948 | A | 4/2017 |
| KR | 10-1734139 | B1 | 5/2017 |
| KR | 10-2019-0081329 | A | 7/2019 |
| KR | 10-2019-0086171 | A | 7/2019 |
| KR | 10-2019-0087657 | A | 7/2019 |
| KR | 10-2019-0091850 | A | 8/2019 |
| KR | 10-2019-0095046 | A | 8/2019 |
| KR | 10-2020-0022793 | A | 3/2020 |

BATTERY PACK AND VEHICLE INCLUDING THE SAME

TECHNICAL FIELD

The present disclosure relates to a battery pack, and a vehicle including the battery pack.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components.

The conventional battery pack is recently mounted as an energy source to an electric vehicle or the like. As the demand for a high-capacity electric vehicle increases, more battery cells tend to be included in the battery pack for securing a higher capacity.

The high-capacity battery pack is heavy and thus is generally located at a bottom portion of the vehicle. For this reason, there is an explosion risk due to external impact at the bottom portion of the vehicle. External impacts are frequently generated at the bottom portion of the vehicle on uneven roads such as unpaved roads or speed humps.

The conventional battery pack is fixedly mounted to the bottom portion of the vehicle so as not to move. Due to various driving environments, irregular external impacts may be applied to the entire outer surface of the battery pack. If the external impacts are applied, the battery pack may be cracked, fired or severely exploded due to the difference between a region receiving impacts relatively heavily and a region receiving impacts relatively lightly.

Therefore, there is a need for a more fundamental solution to provide a battery pack that may increase safety when an external impact is applied to the battery pack mounted to a vehicle or the like.

DISCLOSURE

Technical Problem

The present disclosure is directed to providing a battery pack, which may increase safety when an external impact is applied, and a vehicle including the battery pack.

Technical Solution

In order to solve the object, the present disclosure provides a battery pack mounted to a vehicle, comprising: a plurality of battery modules, each battery module of the plurality of battery modules having at least one battery cell; and at least one magnetic member provided to one side surface of facing battery modules among the plurality of battery modules to at least partially detachably fix the plurality of battery modules to each other.

The battery pack may further comprise at least one connection wire having a predetermined length and configured to connect neighboring battery modules among the plurality of battery modules to each other.

The battery pack may further comprise at least one buffering member provided to an outer side of each battery module of the plurality of battery modules, the at least one buffering member contacting an inner surface of the vehicle.

The plurality of battery modules may be at least partially separated from each other when an external impact is applied to the vehicle.

The at least one magnetic member may restore each battery module of the plurality of battery modules to an original location, when the external impact applied to the vehicle is released.

The at least one buffering member may be provided to at least one of a left portion, a right portion and a bottom portion of each battery module of the plurality of battery modules.

The at least one buffering member may be an elastic spring.

Each battery module of the plurality of battery modules may further include: a module case configured to package the at least one battery cell, wherein the at least one magnetic member may be provided to an outer surface of the module case.

The at least one magnetic member may be formed integrally with the module case.

In addition, the present disclosure provides a vehicle, comprising at least one battery pack according to the above embodiments.

Advantageous Effects

According to various embodiments as above, it is possible to provide a battery pack, which may improve the safety against an external impact, and a vehicle including the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
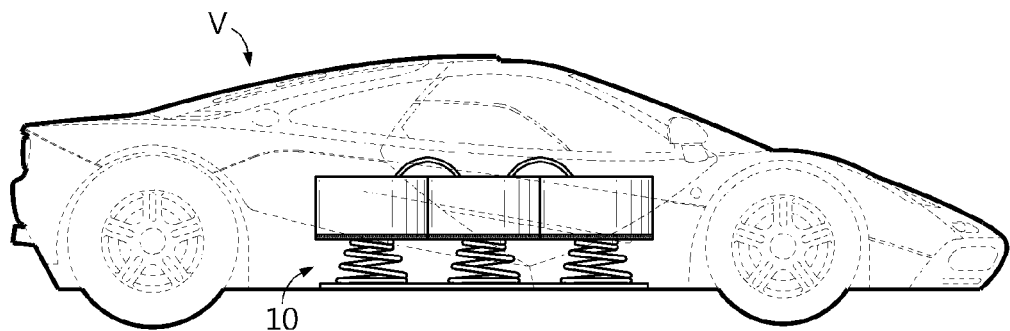
FIG. 1 is a diagram for illustrating a vehicle according to an embodiment of the present disclosure.
Figure 2:
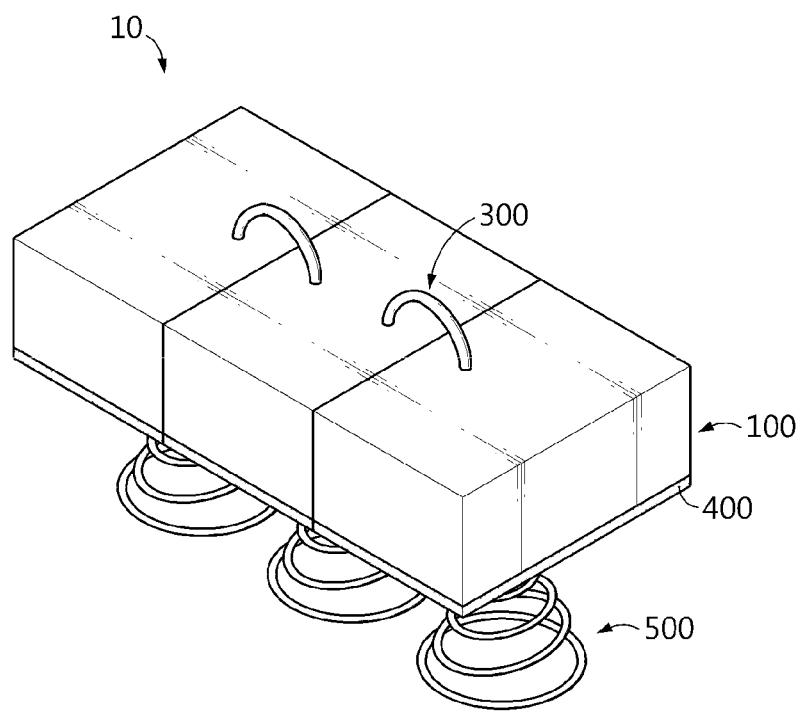
FIG. 2 is a diagram for illustrating a battery pack of the vehicle of FIG. 1.
Figure 3:
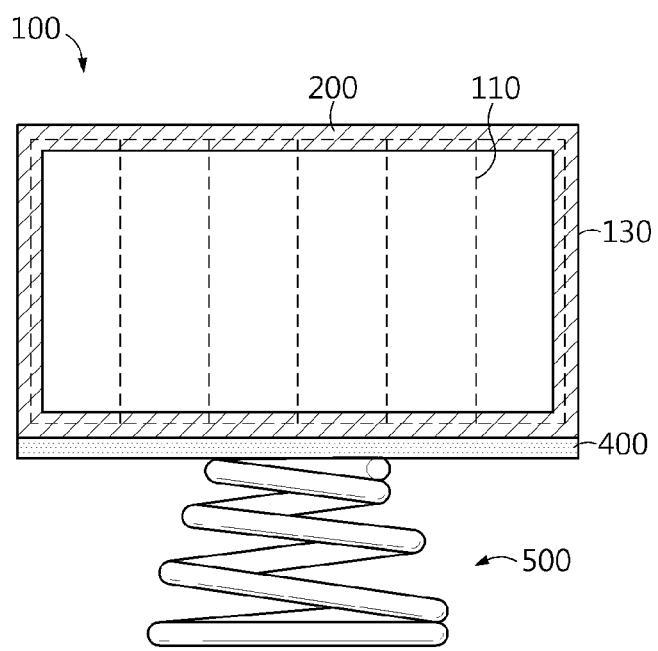
FIG. 3 is a diagram for illustrating a front surface of a battery module of the battery pack of FIG. 2.
Figure 4:
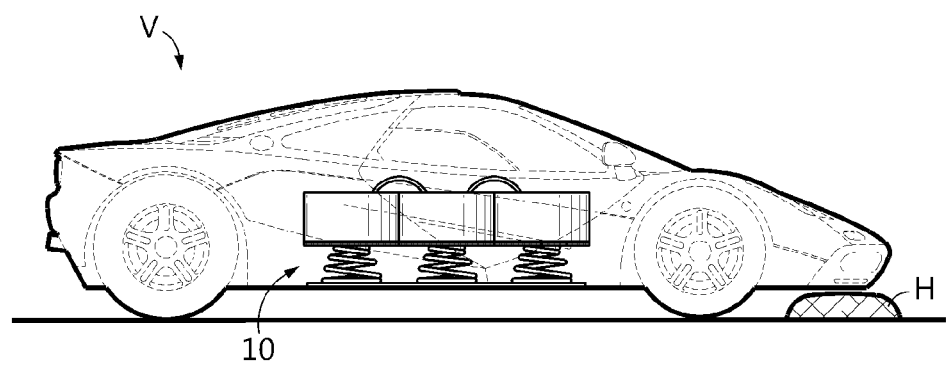
FIGS. 4 to 7 are diagrams for illustrating operations of the battery pack when an external impact is applied to the vehicle of FIG. 1.
Figure 5:
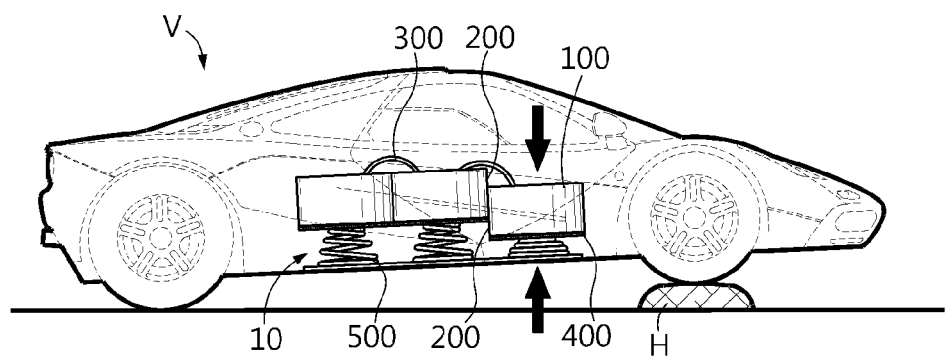
Figure 6:
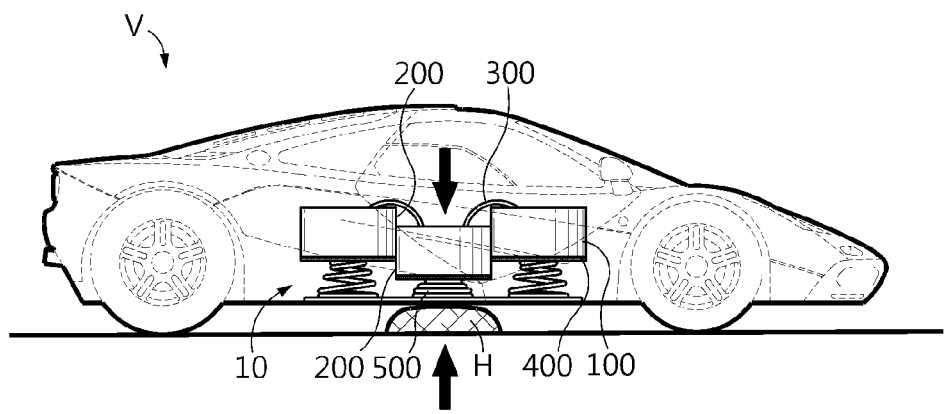
Figure 7:
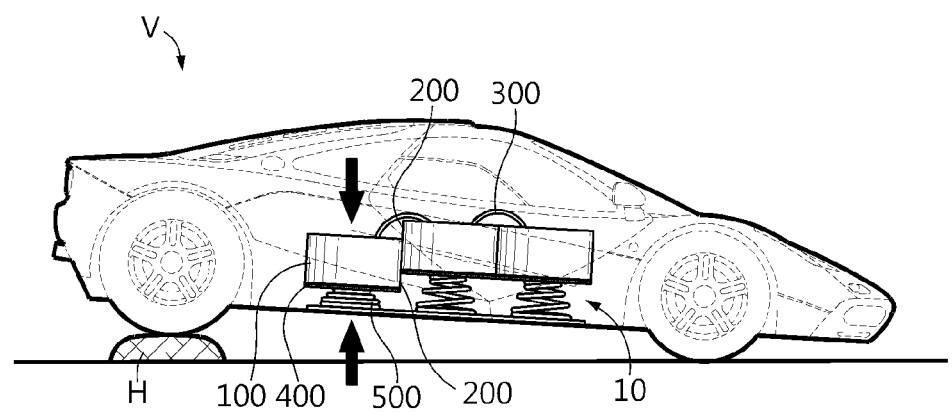

FIG. 1 is a diagram for illustrating a vehicle according to an embodiment of the present disclosure, FIG. 2 is a diagram for illustrating a battery pack of the vehicle of FIG. 1, and FIG. 3 is a diagram for illustrating a front surface of a battery module of the battery pack of FIG. 2.

Referring to FIGS. 1 to 3, a vehicle V may be an electric vehicle, a hybrid electric vehicle, or any other-type vehicle using a battery pack 10, explained later, as an energy source. The vehicle V may include at least one or more battery packs 10.

The battery pack 10 is mounted to a bottom portion of the vehicle V and may include a battery module 100, a magnetic member 200, a connection wire 300, a mounting guide plate 400, and a buffering member 500.

The battery module 100 may be provided in the number of at least one or more. Hereinafter, this embodiment will be described based on the case where a plurality of battery modules 100 are provided so as to secure a high capacity.

Each of the plurality of battery modules 100 may include a battery cell 110 and a module case 130.

The battery cell 110 is a secondary battery and may be provided in the number of at least one or more. Hereinafter, this embodiment will be described based on the case where a plurality of battery cells 110 are provided.

The plurality of battery cells 110 may be stacked on each other to be electrically connected to each other. The plurality of battery cells 110 may be separated from each other at least partially when an external impact is applied to the vehicle V. The mechanism related to the at least partial separation of the plurality of battery cells 110 will be described later in detail.

The plurality of battery cells 110 may include at least one of pouch-type secondary batteries, rectangular secondary batteries, and cylindrical secondary batteries. Hereinafter, this embodiment will be described based on the case where the plurality of battery cells 110 are pouch-type secondary batteries.

The module case 130 may package the plurality of battery cells 110 and various electrical components of the battery module 100. To this end, the module case 130 may have an accommodation space for accommodating the plurality of battery cells 110 and the various electrical components.

The magnetic member 200 may be provided to one side surface of facing battery modules 100 among the plurality of battery modules 100 and may detachably fix the plurality of battery modules 100 to each other at least partially.

Specifically, the magnetic member 200 may be provided to an edge of an outer surface of the module case 130 of the facing battery modules 100. The magnetic member 200 may be separately mounted to the edge of the outer surface of the module case 130 or may be integrally formed on the outer surface of the module case 130.

The magnetic member 200 is coupled to a magnetic member 200 of a facing battery module 100 before an external impact is applied to the vehicle V to fix the plurality of battery modules 100 to each other. However, if an external impact over a predetermined magnitude is applied to the vehicle V, the magnetic member 200 may be separated from the magnetic member 200 of the facing battery module 100 at least partially so that the plurality of battery modules 100 are separated at least partially.

Moreover, if the external impact applied to the vehicle V is released, the magnetic member 200 may be coupled again with the magnetic member 200 of the neighboring battery module 100 to restore the plurality of battery modules 100 to their original locations before the external impact is applied, thereby fixing the plurality of battery modules 100 to each other at their initial locations.

The connection wire 300 has a predetermined length and may connect neighboring battery modules 100 among the plurality of battery modules 100 to each other. The connection wire 300 may be a wire 300 capable of implementing a bus bar function that electrically connects the battery modules 100.

The mounting guide plate 400 is for guiding the buffering member 500, explained later, to be fixed to the plurality of battery modules 100. A plurality of mounting guide plates 400 may be provided to a bottom surface of the battery modules 100. The buffering member 500, explained later, may be mounted to the plurality of mounting guide plate 400.

The buffering member 500 may be provided in the number of at least one or more. Specifically, the buffering member 500 may be provided in a number corresponding to the number of the battery modules 100. Hereinafter, this embodiment will be described based on the case where a plurality of buffering members 500 are provided.

The plurality of buffering members 500 may be provided to an outer side outside of the plurality of battery modules 100, specifically to at least one of left and right portions and a bottom portion of the plurality of battery modules 100, respectively, and may contact an inner surface of the vehicle V. More specifically, one end of each buffering member 500 may be fixed to the mounting guide plate 400 provided to the bottom portion of each battery module 100, and the other end of each buffering member 500 may be fixed to the inner surface of the bottom portion of the vehicle V.

The plurality of buffering members 500 may be made of elastic springs. The plurality of buffering members 500 may also be prepared using other members having a predetermined elasticity and giving a buffering function, without being limited thereto.

Hereinafter, the operation of the battery pack 10 according to this embodiment when an external impact is applied will be described in more detail.

According to various driving conditions of the vehicle V, irregular external impacts may be applied to the battery pack 10. For example, when the vehicle V passes a speed hump or an unpaved road, an impact may be applied to the bottom portion of the vehicle V.

In general, a battery pack 10 having a high capacity is mounted to the bottom portion of the vehicle V. Thus, in order to prevent a dangerous situation such as cracking, fire or explosion of the battery pack 10 when an impact is applied to the bottom portion of the vehicle V, it is necessary to effectively mitigate the impact transferred to the battery pack 10.

FIGS. 4 to 7 are diagrams for illustrating operations of the battery pack when an external impact is applied to the vehicle of FIG. 1.

Referring to FIGS. 4 to 7, when the vehicle V passes a speed hump H, an impact of a predetermined magnitude or above may be applied to the bottom portion of the vehicle V. In this embodiment, as the vehicle V passes the speed hump H, the plurality of battery modules 100 may be separated at least partially along a driving direction of the vehicle V, thereby mitigating the external impact.

Here, as the vehicle V passes the speed hump H, the buffering members 500 may be elastically deformed sequentially to buffer the impact transferred to the plurality of battery modules 100.

If the vehicle V completely passes the speed hump H, namely if the applied impact is released, the plurality of battery modules 100 may return to their original location due to the magnetic force of the magnetic members 200.

In summary, as the vehicle V passes the speed hump H, the plurality of battery modules 100 of the battery pack 10 may be at least partially separated sequentially and then restored to their original locations.

As described above, the battery pack 10 according to this embodiment has a structure in which the plurality of battery modules 100 are instantly separated when an external impact or the like is applied, thereby effectively distributing the external impact. Thus, it is possible to minimize that irregular external impacts are applied to a specific region from the entire region of the battery pack 10.

Accordingly, when an external impact is applied since the vehicle passes an obstacle such as the speed hump H, the battery pack 10 according to this embodiment may effectively prevent the impact from focusing on a specific region from the entire region of the battery pack 10. Thus, it is possible to significantly reduce the risk of cracking, fire, and even explosion of the battery pack 10, caused by the difference between a region receiving the impact heavily and a region receiving the impact lightly.

Figure 8:
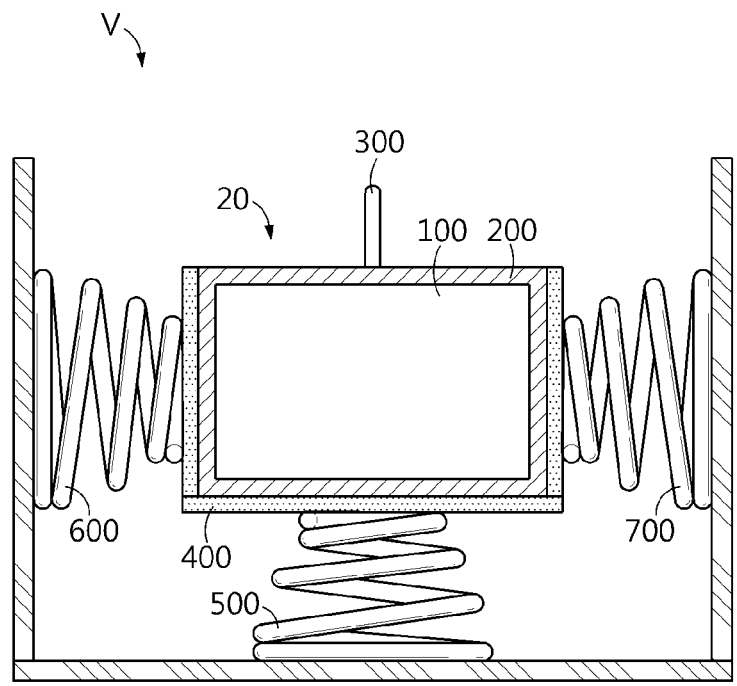
FIG. 8 is a diagram for illustrating a battery pack of the vehicle of FIG. 1 according to another embodiment.

FIG. 8 is a diagram for illustrating a battery pack of the vehicle of FIG. 1 according to another embodiment.

Since the battery pack 20 according to this embodiment is similar to the battery pack 10 of the former embodiment, a duplicate description of the same or similar configuration as the battery pack 10 of the former embodiment will be omitted, and hereinafter, different points from the former embodiment will be focused.

Referring to FIG. 8, a battery pack 20 may include a battery module 100, a magnetic member 200, a connection wire 300, a mounting guide plate 400, and buffering members 500, 600, 700.

Since the battery module 100, the magnetic member 200 and the connection wire 300 are substantially identical as or similar to those of the former embodiment, redundant descriptions thereof will be omitted.

The mounting guide plate 400, unlike the former embodiment, may be provided to both sides of the battery module 100 as well as the bottom portion of the battery module 100.

Unlike the former embodiment, the buffering members 500, 600, 700 may be provided to at least one of both sides of the battery module 100 as well as the bottom portion of the battery module 100.

Specifically, the buffering members 500, 600, 700 may be fixedly mounted to the mounting guide plate 400 provided to the bottom portion and both sides of the battery module 100. More specifically, the buffering member 500 may be fixed to the bottom portion of the battery module 100 and the inner side of the bottom portion of the vehicle V, and the buffering members 600, 700 may be fixed to both sides of the battery module 100 and the inner side of both side portions of the vehicle V.

Here, the buffering members 600, 700 may be provided to all of both sides of each battery module 100 or may be provided in a zigzag form in the stacking direction of the plurality of battery modules 100.

Hereinafter, the operation of the battery pack 20 according to this embodiment when an external impact is applied will be described in more detail.

Figure 9:
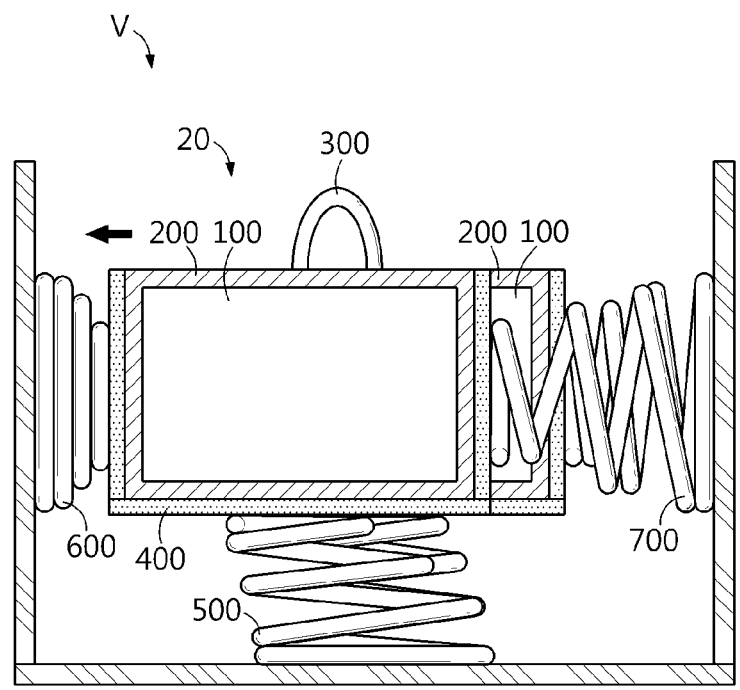
FIGS. 9 and 10 are diagrams for illustrating operations of the battery pack when an external impact is applied to the vehicle of FIG. 1.
Figure 10:
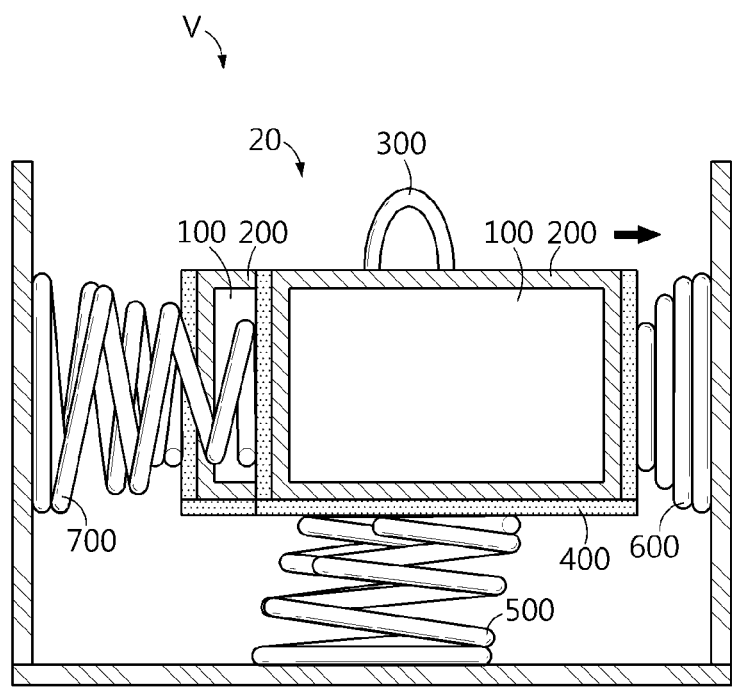

FIGS. 9 and 10 are diagrams for illustrating operations of the battery pack when an external impact is applied to the vehicle of FIG. 1.

When the vehicle V is driven, sudden handling to the left and right may occur to make a curve left and right due to road conditions or unexpected situations.

Referring to FIG. 9, when the vehicle V is driven, if a sudden left turn occurs, a centrifugal force may be transferred to the battery pack 20 due to the left turn. If this situation occurs, the plurality of battery modules 100 according to this embodiment may be at least partially separated along the left direction to mitigate the external impact caused by the centrifugal force.

Referring to FIG. 10, when the vehicle V is driven, if a sudden right turn occurs, a centrifugal force may be transferred to the battery pack 20 due to the right turn. If this situation occurs, the plurality of battery modules 100 according to this embodiment may be at least partially separated along the right direction to mitigate the external impact caused by the centrifugal force.

As described above, the battery pack 20 according to this embodiment may effectively mitigate the impact transferred to the battery pack 20 even when an impact is applied to the left or right side of the vehicle V, in addition to case where an impact is applied to the bottom portion of the vehicle V.

According to various embodiments as described above, it is possible to provide the battery pack 10, 20 capable of increasing the safety against an external impact, and the vehicle V including the battery pack 10, 20.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery pack mounted to a vehicle, comprising:
   a plurality of battery modules, each battery module of the plurality of battery modules having at least one battery cell, the plurality of battery modules stacked in a first direction;
   at least one magnetic member provided to one side surface of facing battery modules among the plurality of battery modules to at least partially detachably fix the plurality of battery modules to each other; and a plurality of mounting guide plates, each of the plurality of mounting guide plates supported by at least one buffering member provided to an outer side of each battery module of the plurality of battery modules, the at least one buffering member contacting an inner surface of the vehicle,
wherein the plurality of battery modules are mounted on a respective one of the plurality of mounting guide plates to form a plurality of pairs, and
wherein the pairs are movable independent of one another in a second direction perpendicular to the first direction.

2. The battery pack according to claim 1, further comprising:
at least one connection wire having a predetermined length and configured to connect neighboring battery modules among the plurality of battery modules to each other.

3. The battery pack according to claim 1, wherein the plurality of battery modules are at least partially separated from each other when an external impact is applied to the vehicle.

4. The battery pack according to claim 3, wherein the at least one magnetic member restores each battery module of the plurality of battery modules to an original location when the external impact applied to the vehicle is released.

5. The battery pack according claim 1, wherein the at least one buffering member is provided to at least one of a left portion, a right portion and a bottom portion of each battery module of the plurality of battery modules.

6. The battery pack according to claim 1, wherein the at least one buffering member is an elastic spring.

7. The battery pack according to claim 1, wherein each battery module of the plurality of battery modules further includes:
a module case configured to package the at least one battery cell,
wherein the at least one magnetic member is provided to an outer surface of the module case.

8. The battery pack according to claim 7, wherein the at least one magnetic member is formed integrally with the module case.

9. The battery pack according to claim 1, wherein the at least one buffering member is connected to a first mounting guiding plate of the plurality of mounting guide plates.

10. The battery pack according to claim 9, wherein the first mounting guiding plate comprises a bottom portion, a right portion and a left portion, and
wherein the at least one buffering member comprises a first buffering member connected to the bottom portion of the first mounting guiding plate, a second buffering member connected to the right portion of the first mounting guiding plate and a third buffering member connected to the left portion of the first mounting guiding plate.

11. The battery pack according to claim 1, wherein the plurality of battery modules are movable relative to one another in a third direction perpendicular to the first direction and second direction.

12. A vehicle, comprising at least one battery pack according to claim 1.

\* \* \* \* \*